United States Patent
Natanzon

(10) Patent No.: US 9,367,260 B1
(45) Date of Patent: Jun. 14, 2016

(54) DYNAMIC REPLICATION SYSTEM

(71) Applicant: EMC Corporation, Hopkinton, MA (US)

(72) Inventor: Assaf Natanzon, Tel Aviv (IL)

(73) Assignee: EMC Corporation, Hopkinton, MA (US)

(*) Notice: Subject to any disclaimer, the term of this patent is extended or adjusted under 35 U.S.C. 154(b) by 59 days.

(21) Appl. No.: 14/105,706

(22) Filed: Dec. 13, 2013

(51) Int. Cl.
*G06F 12/00* (2006.01)
*G06F 3/06* (2006.01)

(52) U.S. Cl.
CPC ............... *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,618,794 B1 * | 9/2003 | Sicola et al. ................. 711/154 |
| 6,621,493 B1 | 9/2003 | Whitten |
| 6,804,676 B1 | 10/2004 | Bains, II |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; p. 1.

(Continued)

*Primary Examiner* — Baboucarr Faal
(74) *Attorney, Agent, or Firm* — Daly, Crowley, Mofford & Durkee, LLP

(57) ABSTRACT

In one aspect, a method includes replicating a first volume in a data protection system by sending data from the first volume to a replica site, determining whether the replica site should transition from a journal mode to a non-journal mode or transition from the non-journal to the journal mode based on the performance of the data protection system, transitioning the replica site from the journal mode to the non-journal mode if the performance of the data protection system degrades based on a first performance threshold and transitioning the replica site from the non-journal mode to the journal mode if the performance of the data protection system improves based on a second performance threshold.

20 Claims, 8 Drawing Sheets

(56) References Cited

U.S. PATENT DOCUMENTS

| | | |
|---|---|---|
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,085,904 B2 * | 8/2006 | Mizuno ............... G06F 11/1451 707/999.202 |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Hellen et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0111510 A1 * | 6/2004 | Shoaib ............... H04L 69/40 709/224 |
| 2004/0205092 A1 | 10/2004 | Longo et al. |
| 2004/0250032 A1 | 12/2004 | Ji et al. |

(56) References Cited

U.S. PATENT DOCUMENTS

| | | | |
|---|---|---|---|
| 2004/0254964 A1 | 12/2004 | Kodama et al. | |
| 2005/0015663 A1 | 1/2005 | Armangau et al. | |
| 2005/0028022 A1 | 2/2005 | Amano | |
| 2005/0049924 A1 | 3/2005 | DeBettencourt et al. | |
| 2005/0172092 A1 | 8/2005 | Lam et al. | |
| 2005/0182888 A1* | 8/2005 | Murotani et al. | 711/1 |
| 2005/0273655 A1 | 12/2005 | Chow et al. | |
| 2006/0031647 A1 | 2/2006 | Hirakawa et al. | |
| 2006/0047996 A1 | 3/2006 | Anderson et al. | |
| 2006/0064416 A1 | 3/2006 | Sim-Tang | |
| 2006/0107007 A1 | 5/2006 | Hirakawa et al. | |
| 2006/0117211 A1 | 6/2006 | Matsunami et al. | |
| 2006/0161810 A1 | 7/2006 | Bao | |
| 2006/0179343 A1 | 8/2006 | Kitamura | |
| 2006/0195670 A1 | 8/2006 | Iwamura et al. | |
| 2006/0212462 A1 | 9/2006 | Hellen et al. | |
| 2006/0282485 A1* | 12/2006 | Aggarwal et al. | 707/206 |
| 2007/0055833 A1 | 3/2007 | Vu et al. | |
| 2007/0067586 A1* | 3/2007 | Mikami | 711/162 |
| 2007/0162513 A1 | 7/2007 | Lewin et al. | |
| 2007/0180304 A1 | 8/2007 | Kano | |
| 2007/0198602 A1 | 8/2007 | Ngo et al. | |
| 2007/0198791 A1 | 8/2007 | Iwamura et al. | |
| 2007/0220311 A1 | 9/2007 | Lewin et al. | |
| 2007/0266053 A1 | 11/2007 | Ahal et al. | |
| 2007/0271429 A1* | 11/2007 | Eguchi et al. | 711/162 |
| 2008/0082591 A1 | 4/2008 | Ahal et al. | |
| 2008/0082592 A1 | 4/2008 | Ahal et al. | |
| 2008/0082770 A1 | 4/2008 | Ahal et al. | |
| 2009/0216973 A1* | 8/2009 | Nakajima et al. | 711/162 |
| 2009/0276661 A1* | 11/2009 | Deguchi et al. | 714/18 |
| 2012/0096225 A1* | 4/2012 | Khawand et al. | 711/119 |

OTHER PUBLICATIONS

Soules, "Metadata Efficiency in Versioning File Systems;" 2003; pp. 1-16.
AIX System Management Concepts; Operating Systems and Devices; May 2000; pp. 1-280.
Soules et al.; "Metadata Efficiency in a Comprehensive Versioning File System;" May 2002; CMU-CS-02-145; School of Computer Science, Carnegie Mellon University, Pittsburgh, PA 15213; 33 pages.
Linux Filesystems; Sams Publishing; 2002; pp. 17-22 and 67-71.
Bunyan, "Multiplexing in a BrightStor® ARCserve® Backup Release 11;" Mar. 2004; pp. 1-4.
Marks, "Network Computing;" Feb. 2, 2006; pp. 1-8.
Hill, "Network Computing;" Jun. 6, 2006; pp. 1-9.
Microsoft Computer Dictionary; 2002; Press Fifth Edition; 2 pages.
Retrieved from http://en.wikipedia.org/wiki/DEFLATE; DEFLATE; Jun. 19, 2008; pp. 1-6.
Retrieved from http://wn.wikipedia.org/wiki/Huffman_coding; Huffman Coding; Jun. 8, 2008; pp. 1-11.
Retrieved from http://en.wikipedia.org/wiki/LZ77; LZ77 and LZ78; Jun. 17, 2008; pp. 1-2.
U.S. Appl. No. 11/609,580 downloaded Jan. 7, 2015 265 pages.
U.S. Appl. No. 12/057,652 downloaded Jan. 7, 2015 296 pages.
U.S. Appl. No. 11/609,561 downloaded Jan. 7, 2015 219 pages.
U.S. Appl. No. 11/356,920 downloaded Jan. 7, 2015 272 pages.
U.S. Appl. No. 10/512,687 downloaded Jan. 7, 2015 Part 1 of 2; 300 pages.
U.S. Appl. No. 10/512,687 downloaded Jan. 7, 2015 Part 2 of 2; 254 pages.
U.S. Appl. No. 11/536,233 downloaded Jan. 7, 2015 256 pages.
U.S. Appl. No. 11/536,215 downloaded Jan. 7, 2015 172 pages.
U.S. Appl. No. 11/536,160 downloaded Jan. 7, 2015 230 pages.
U.S. Appl. No. 11/964,168 downloaded Jan. 7, 2015 222 pages.

* cited by examiner

DYNAMIC REPLICATION SYSTEM

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes replicating a first volume in a data protection system by sending data from the first volume to a replica site, determining whether the replica site should transition from a journal mode to a non-journal mode or transition from the non-journal to the journal mode based on the performance of the data protection system, transitioning the replica site from the journal mode to the non-journal mode if the performance of the data protection system degrades based on a first performance threshold and transitioning the replica site from the non-journal mode to the journal mode if the performance of the data protection system improves based on a second performance threshold.

In another aspect, an apparatus includes electronic hardware circuitry configured to replicate a first volume in a data protection system by sending data from the first volume to a replica site, determine whether the replica site should transition from a journal mode to a non-journal mode or transition from the non-journal to the journal mode based on the performance of the data protection system, transition the replica site from the journal mode to the non-journal mode if the performance of the data protection system degrades based on a first performance threshold and transition the replica site from the non-journal mode to the journal mode if the performance of the data protection system improves based on a second performance threshold.

In a further aspect, an article includes a non-transitory computer-readable medium that stores computer-executable instructions. The instructions causing a machine to replicate a first volume in a data protection system by sending data from the first volume to a replica site, determine whether the replica site should transition from a journal mode to a non-journal mode or transition from the non-journal to the journal mode based on the performance of the data protection system, transition the replica site from the journal mode to the non-journal mode if the performance of the data protection system degrades based on a first performance threshold and transition the replica site from the non-journal mode to the journal mode if the performance of the data protection system improves based on a second performance threshold.

DETAILED DESCRIPTION

Figure 1:
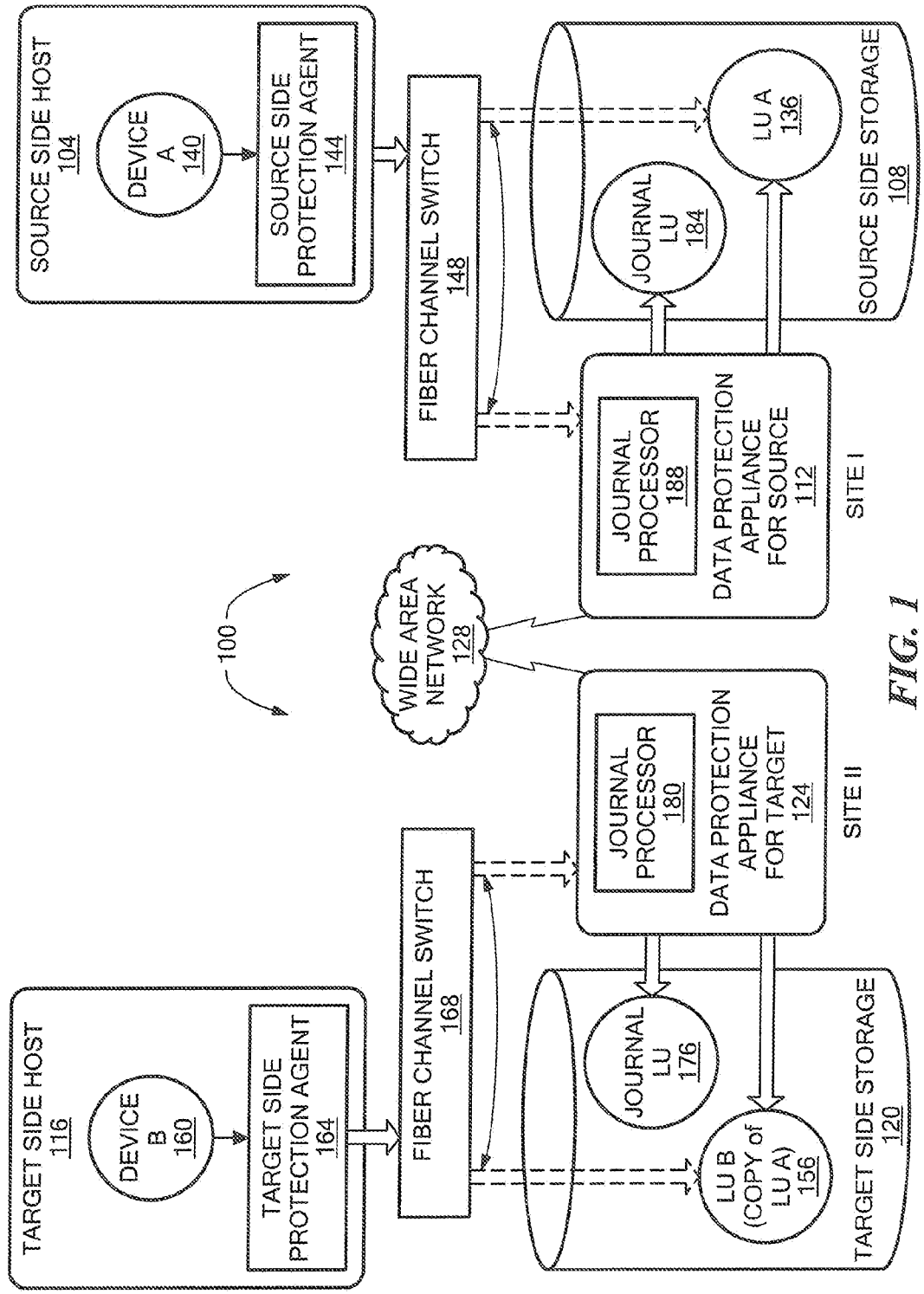
FIG. 1 is a block diagram of an example of a data protection system.

Described herein is a data replication system that may dynamically change from a journaling mode to a non-journaling mode and visa-versa for a data replication system that performs snapshots or continuous data protection, for example.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

JOURNAL MODE—a journal is used on the replica site;

NON-JOURNAL MODE—a journal is not used on the replica site;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITtER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A. host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
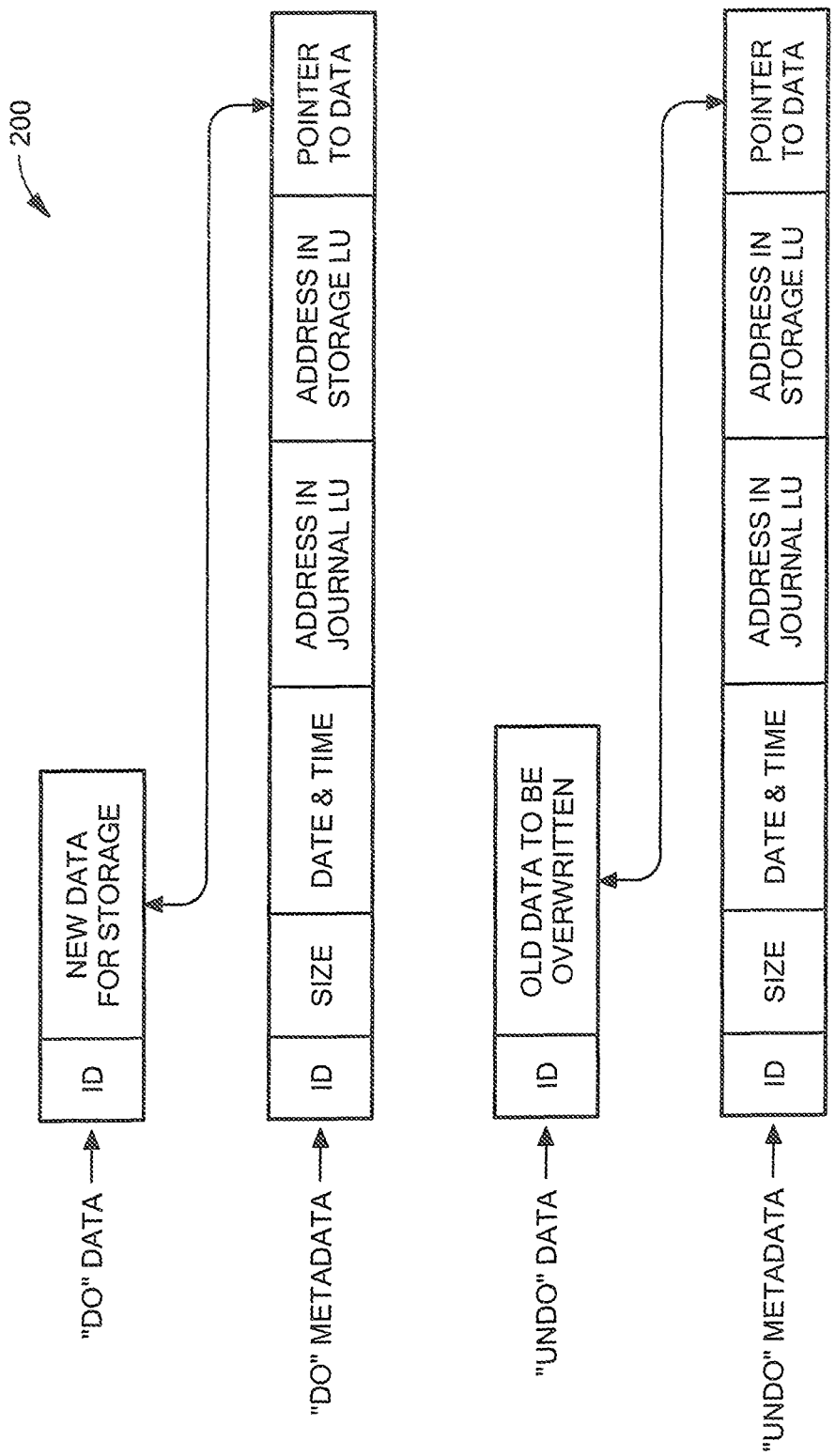
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

The data replication system 100 in FIG. 1 may be further modified to dynamically change. For example, the data replication system 100 may dynamically change from performing journaling (a journaling mode) to non-journaling (a non-journaling mode) and visa-versa for a data replication system that performs snapshots or continuous data protection, for example.

Figure 3:
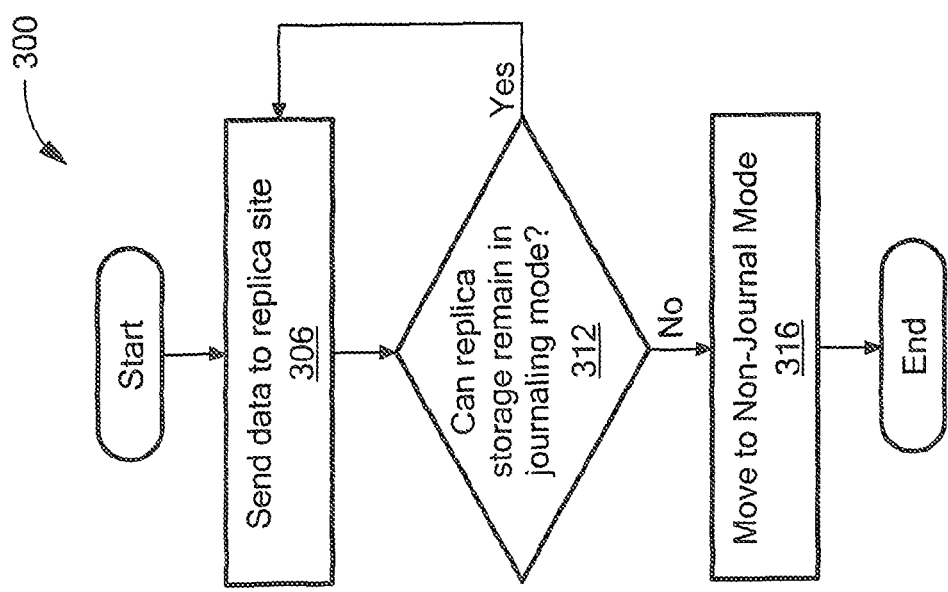
FIG. 3 is a flowchart of an example of a process to transition from a journal mode to a non-journal mode.

Referring to FIG. 3, an example of a process to transition from a journal mode to a non-journal mode is a process 300. Process 300 sends data to the replica site (306). For example, I/O data is sent to the replica storage.

Process 300 determines if the replica storage should remain in journaling mode (312). For example, process 300 determines if the performance of the data protection system 100 remains at performing at a performance level that supports journaling. In one particular example, process 300 determines if the storage bandwidth is still available to perform the journaling. In another particular example, response times are below a certain threshold. In a further example, the current storage throughput is not below a certain threshold.

Process 300 continues to send data to the replica site (306) if the replica storage should remain in the journal mode because its performance has not degraded based on a predetermined performance threshold. Process 300 moves to non-journal mode (316) if the replica storage should not remain in journal mode, if, for example, the replica storage system's response time is higher than a threshold or journal lag grows to be larger than a threshold, or required storage bandwidth is higher than a threshold.

Figure 4:
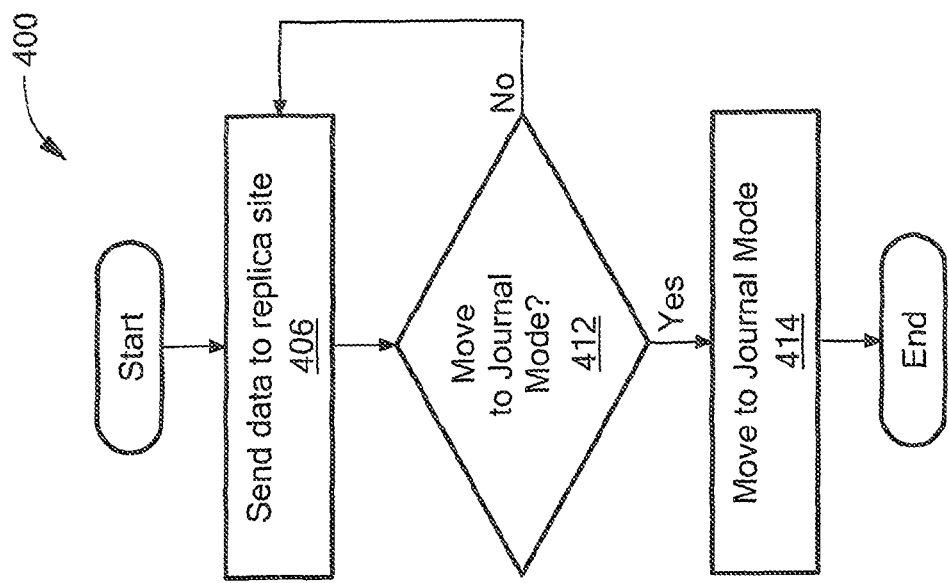
FIG. 4 is a flowchart of an example of a process to transition from the non-journal mode to the journal mode.

Referring to FIG. 4, an example of a process to transition from a non-journal mode to a journal mode is a process 400. Process 400 sends data to the replica site (406). For example, I/O data is sent to the replica storage. Process 400 determines if the replica storage should move to the journaling mode (412). For example, process 400 determines if the performance of the data protection system 100 is now performing at a performance level that supports journaling. In one particular example, process 400 determines if the storage bandwidth is now available to perform the journaling. In one particular example, the response times are now below a certain threshold or the I/O throughput is now below a certain threshold.

Process 400 continues to send data to the replica site (406) if the replica storage should remain in the non-journal mode. Process 400 moves to the journal mode (416) if the replica storage can move to the journal mode because its performance based one predetermined performance threshold.

Figure 5:
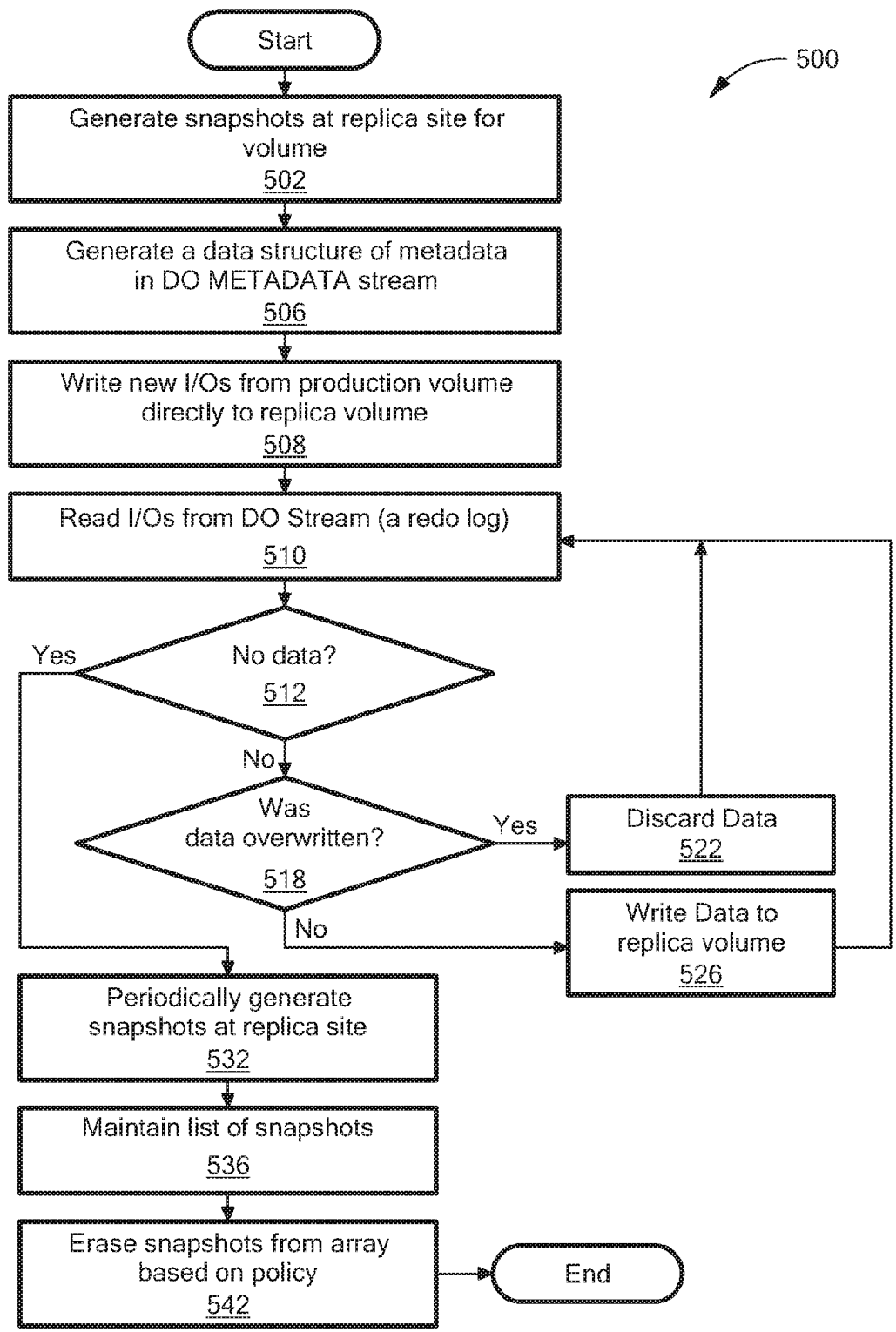
FIG. 5 is a flowchart of an example of a process to move to the non-journal mode.

Referring to FIG. 5, an example of a process to move to the non-journal mode is a process 500. Process 500 generates a storage array snapshot of a replica volume at the replica site (502).

Process 500 generates a data structure of metadata in the DO METADATA Stream (sometimes called a redo log) (506). The data structure includes locations that were overwritten after moving to the non-journal node. For example, the data structure includes a list of the locations which are currently written in the DO stream and thus are currently different between the production volume and the snapshot taken. The data in the DO stream for these locations has to be applied to the replica volume before erasing the journal. The data structure is used so that if a new IO arrives to a location which is in the journal the data in the journal will not overwrite the newer data and will be discarded.

Process 500 writes new I/Os arriving from production volume directly to the replica volume (508). Process 500 reads I/Os from DO stream (redo log) (510) and determines if there is no data in the DO stream (512) (i.e., process 300 determines if all data from the DO stream was applied to the replica volume and thus the replica volume now has a consistent image of the data). If there is no data in the DO stream, the journal is erased and the process now moves to non-journal based replication (i.e., the new arriving I/Os are no longer tracked in the journal and the journal DO and UNDO streams are empty).

Process 500 periodically generates snapshots of the replica volume at certain points in time at the replica site (532). The replica volume is a replica of the production volume at the replica site, thus all the snapshots at the replica site are taken from the replica volume.

Process 500 maintains a list of the snapshots (536). The snapshots are storage array based and stored in the storage array. The list of snapshots may be stored in the journal and managed by the DPA. Process 500 erases snapshots from the storage array based on a policy (542).

If there is data in the DO stream (i.e., there is data in the journal which must be applied to the replica volume before the journal is erased), process 500 determines if the data read from the journal was overwritten by new data arriving from the production site (518). Since new I/Os from the production site are written in processing block 508 directly to the replica volume, the data which is currently still in the DO stream still needs to be applied to the replica volume to make it consistent with the production volume unless it was overwritten by newer data from the production site in processing block 508. Thus overwritten data from the journal is discarded.

If the data is overwritten, process 500 discards the data (522) and repeats processing block 510 and reads I/Os from the DO stream. If the data is not overwritten, process 500 writes the data to the replica volume (526) and repeats processing block 510 by reading I/Os from the DO stream.

Figure 6:
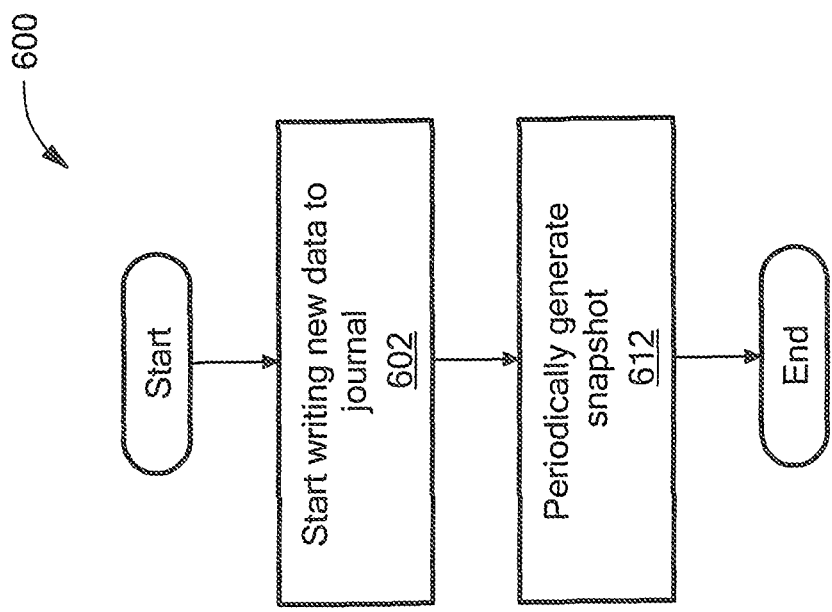
FIG. 6 is a flowchart of an example of a process to move to the journal mode.

Referring to FIG. 6, an example of a process to move to the journal mode is a process 600. Process 600 starts writing new data to the journal (602) and periodically generates a snapshot at the storage array (612).

Figure 7:
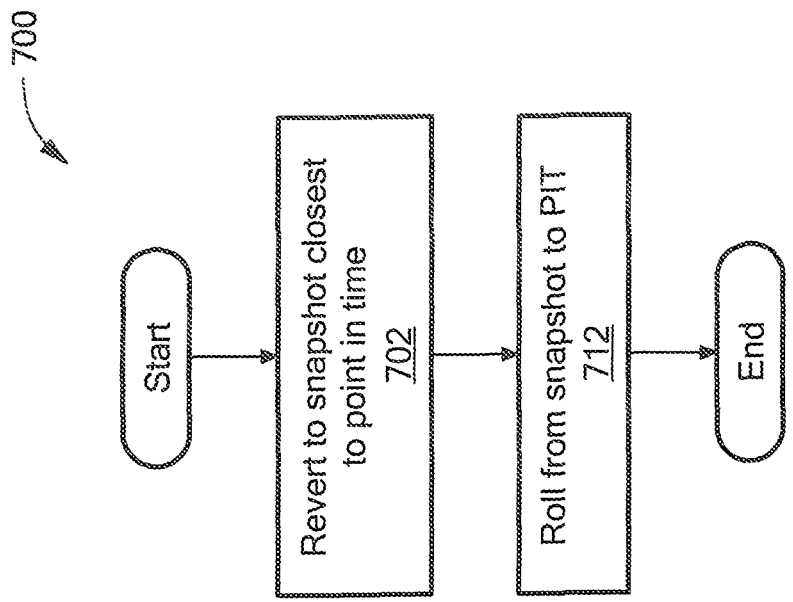
FIG. 7 is a flowchart of an example of a process to access a point-in-time while taking snapshots.

Referring to FIG. 7, an example of a process to access a point-in-time while taking array based snapshots using journaling is a process 700. Process 700 reverts to the array snapshot closest to the point-in-time (702) and rolls data from snapshot to the PIT (712).

Figure 8:
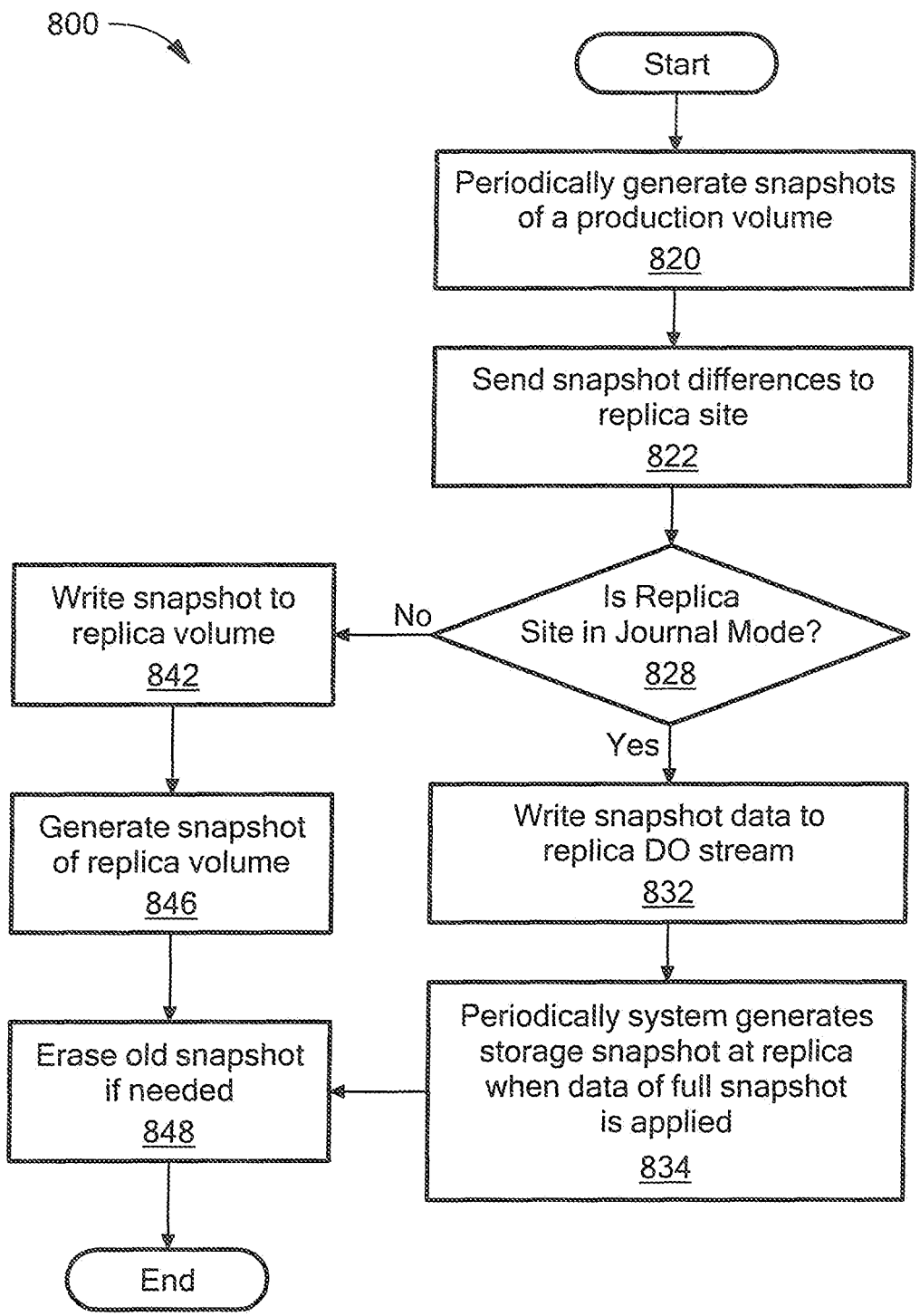
FIG. 8 is a flowchart of an example of a process to perform replication in a snapshot shipping mode with and without journaling at the replica site.

Referring to FIG. 8, an example of a process to perform replication in a snapshot shipping mode with and without journaling at the replica site is a process 800.

Process 800 periodically generates array snapshots of the production volume (820) and sends the differences between snapshots to the replica site (822). Process 800 determines if the replica is in a journal mode (828) and if the replica is in a journal mode, process 800 writes snapshot data to the replica DO stream (632) and periodically generates storage snapshots at the replica site when data of full snapshot is applied (834).

If the replica is not in a journal mode process 800 writes a snapshot to the replica volume (842) and generates a snapshot of the replica volume (846). Process 800 periodically erases old array snapshots if needed (848).

Figure 9A:
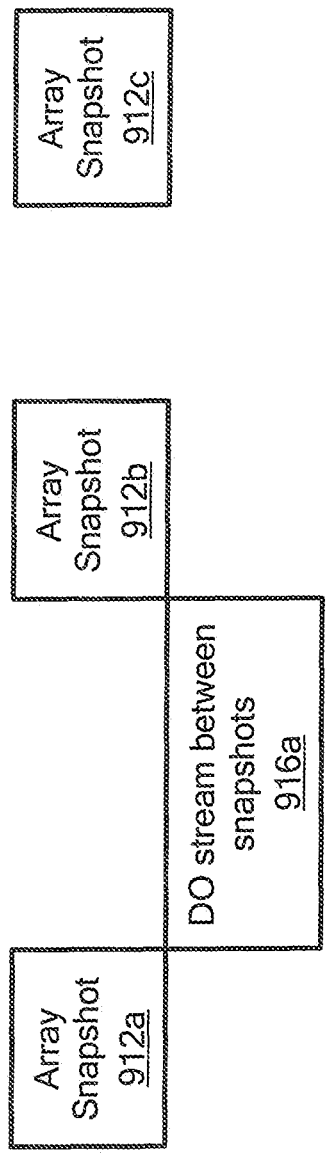
FIG. 9A is a block diagram that depicts a journal mode and a non-journal mode in a continuous data protection mode.

FIG. 9A is a block diagram that depicts a journal mode and use of a non-journal mode in continuous data protection. For example, an array snapshot 912a is generated and after a period of time, a second array snapshot 912a is taken and after a period of time, a third array snapshot 912c is taken. Between generation of the array snapshot 912a and the array snapshot 912b a DO stream 916a is populated (i.e., the system is in the journaling mode). Between the array snapshot 912a and the array snapshot 912b any point-in-time may be accessible. However, between the array snapshot 912b and the array snapshot 912c there is no journaling and thus there is no accessibility between the array snapshots 912b, 912c.

Figure 9B:
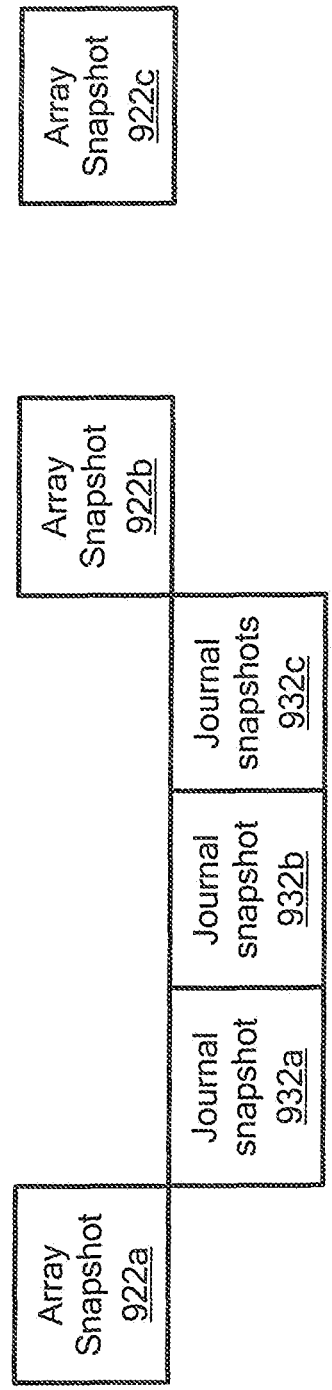
FIG. 9B is a block diagram that depicts a journal mode and a non-journal mode in a snapshot mode.

FIG. 9B is a block diagram that depicts a journal mode and a non-journal mode using snapshots. For example, an array snapshot 922a is generated and after a period of time, a second array snapshot 922b is generated and after a period of time a third array snapshot 922c is generated. Between the array snapshot 922a and the array snapshot 922b a series of journal snapshots (e.g., a journal snapshot 932a, a journal snapshot 932b, and a journal snapshot 932c) are taken (i.e., there is a journal containing the differences between point in time 922a and 932a, the differences from 932a to 932b and the differences from the journal 932b to the journal snapshot 932c (which is a point-in-time identical to the array snapshot 922b)). Between the array snapshot 922a and the array snapshot 922b the point-in-time journal snapshots 932a, 932b are accessible by rolling the journal to the point-in-time 922a. However, between the array snapshot 922b and the array snapshot 922c there are no journaling snapshots and thus there is no accessibility between the array snapshots 922b, 922c.

Figure 10:
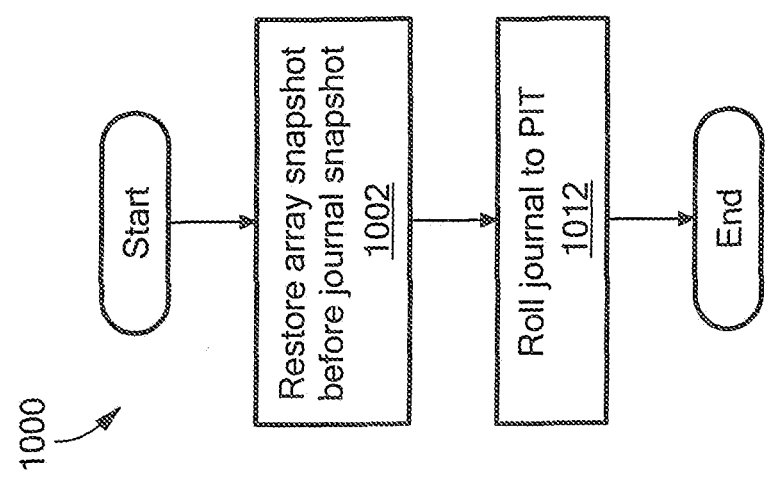
FIG. 10 is a flowchart of an example of a process to restore a snapshot from a journal.

Referring to FIG. 10, an example of a process to restore a snapshot from a journal is a process 1000. Process 1000 restores array snapshot before the journal snapshot (1002) and rolls journal to PIT (1012). For example, if a user wants to roll back to a time during the journal snapshot 932a, the array snapshot 922a is restored and the journal rolls to the time using the journal snapshot 932a.

Figure 11:
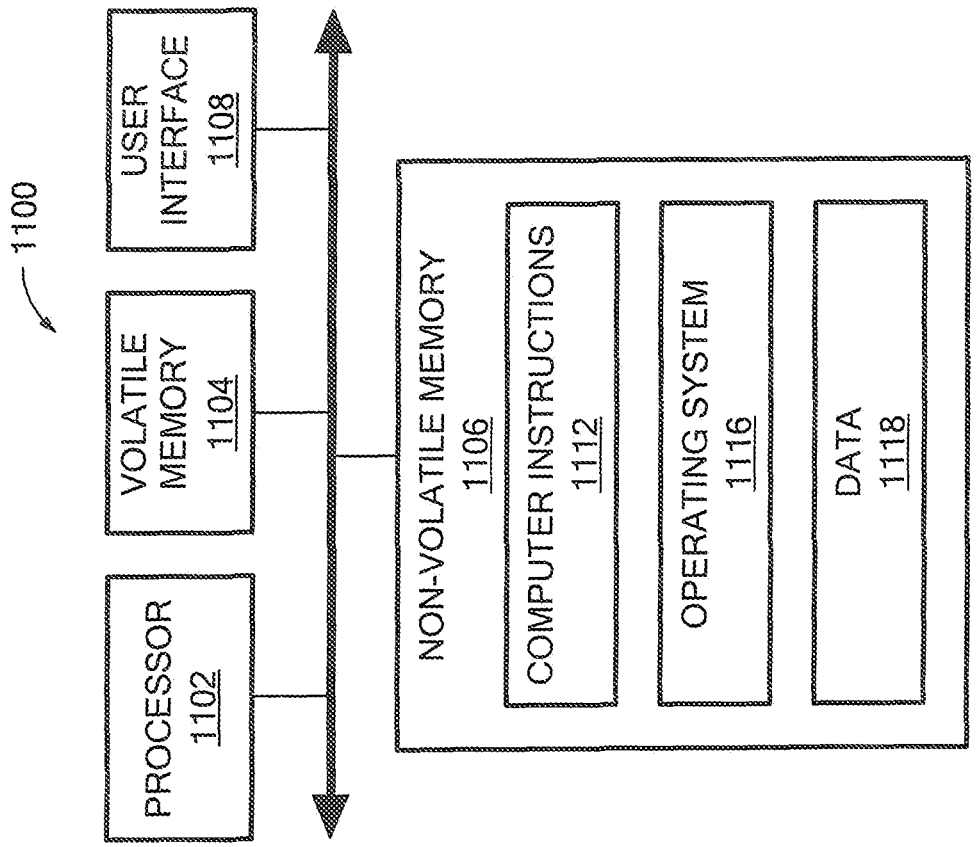
FIG. 11 is a computer on which any of the processes of FIGS. 4 to 8 and 10 may be implemented.

Referring to FIG. 11, in one example, a computer 1100 includes a processor 1102, a volatile memory 1104, a non-volatile memory 1106 (e.g., hard disk) and the user interface (UI) 1108 (e.g., a graphical user interface, a mouse, a keyboard, a display, touch screen and so forth). The non-volatile memory 1106 stores computer instructions 1112, an operating system 1116 and data 1118. In one example, the computer instructions 1112 are executed by the processor 1102 out of volatile memory 1104 to perform all or part of the processes described herein (e.g., processes 300, 400, 500, 600, 700, 800 and 1000).

The processes described herein (e.g., processes 300, 400, 500, 600, 700, 800 and 1000) are not limited to use with the hardware and software of FIG. 11; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300, 400, 500, 600, 700, 800 and 1000 are not limited to the specific processing order of FIGS. 4 to 8 and 10, respectively. Rather, any of the processing blocks of FIGS. 4 to 8 and 10 may be re-ordered, combined or removed, performed in parallel or in serial, as necessary, to achieve the results set forth above.

The processing blocks (for example, in the processes 300, 400, 500, 600, 700, 800 and 1000) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
    replicating a first volume in a data protection system by sending data from the first volume to a replica site;
    determining whether the replica site should transition from a journal mode to a non-journal mode or transition from the non-journal to the journal mode based on the performance of the data protection system;
    transitioning the replica site from the journal mode to the non-journal mode if the performance of the data protection system degrades based on a first performance threshold comprising at least one of a journal lag being larger than a lag threshold and a storage bandwidth being higher than a storage bandwidth threshold; and
    transitioning the replica site from the non-journal mode to the journal mode if the performance of the data protection system improves based on a second performance threshold comprising at least one of the journal lag being smaller than the lag threshold and the storage bandwidth being smaller than the storage bandwidth threshold.

2. The method of claim 1, wherein replicating the first volume by sending the data to a replica site comprises at least one of:
    sending snapshots of the first volume; or
    sending write I/Os for the first volume to the replica site.

3. The method of claim 1 wherein transitioning the replica site from the journal mode to the non-journal mode if the performance of the data protection system degrades comprises:
    generating snapshots of the first volume at the replica site;
    generating a data structure of locations that have been overwritten in a DO stream;
    writing new I/Os from the first volume directly to a second volume; and
    writing data that has not been overwritten from the journal to the second volume.

4. The method of claim 1 wherein transitioning the replica site from the journal mode to the non-journal mode if the performance of the data protection system degrades comprises:
    generating periodically snapshots at the replica site;
    maintaining a list of snapshots; and
    erasing snapshots based on a policy.

5. The method of claim 1 wherein transitioning the replica site from the non-journal mode to the journal mode if the performance of the data protection system improves a second performance threshold comprises:
    writing new data for the first volume to a journal; and generating periodically a snapshot of the replica of first volume.

6. The method of claim 1, further comprising:
periodically generating array snapshots of the first volume;
sending the differences between the array snapshots to the replica site;
writing snapshot data to a replica DO stream if the replica is in a journal mode;
periodically generating storage snapshots at the replica site when data of a full snapshot is applied if the replica is in a journal mode;
writing a snapshot to the replica volume if the replica is not in a journal mode; and
generating a snapshot of the replica volume if the replica is not in a journal mode.

7. The method of claim 1, further comprising:
performing journal snapshots between array snapshots;
receiving a request to restore the replica volume at a point in time;
restoring an array snapshot before a journal snapshot; and
rolling a journal to the point-in-time.

8. An apparatus, comprising:
electronic hardware circuitry configured to:
replicate a first volume in a data protection system by sending data from the first volume to a replica site;
determine whether the replica site should transition from a journal mode to a non-journal mode or transition from the non-journal to the journal mode based on the performance of the data protection system;
transition the replica site from the journal mode to the non-journal mode if the performance of the data protection system degrades based on a first performance threshold comprising at least one of a journal lag being larger than a lag threshold and a storage bandwidth being higher than a storage bandwidth threshold; and
transition the replica site from the non-journal mode to the journal mode if the performance of the data protection system improves based on a second performance threshold comprising at least one of the journal lag being smaller than the lag threshold and the storage bandwidth being smaller than the storage bandwidth threshold.

9. The apparatus of claim 8, wherein the circuitry comprises at least one of a processor, a memory, a programmable logic device or a logic gate.

10. The apparatus of claim 8, wherein the circuitry configured to replicate the first volume by sending the data to a replica site comprises circuitry configured to, at least one of:
send snapshots of the first volume; or
send write I/Os for the first volume to the replica site.

11. The apparatus of claim 8, wherein the circuitry configured to transition the replica site from the journal mode to the non-journal mode if the performance of the data protection system degrades comprises circuitry configured to:
generate snapshots of the first volume at the replica site;
generate a data structure of locations that have been overwritten in a DO stream;
write new I/Os from the first volume directly to a second volume; and
write data that has not been overwritten from the journal to the second volume.

12. The apparatus of claim 8, wherein the circuitry configured to transition the replica site from the non-journal mode to the journal mode if the performance of the data protection system improves a second performance threshold comprises circuitry configured to:
write new data for the first volume to a journal; and
generate periodically a snapshot of the replica of first volume.

13. The apparatus of claim 8, further comprising circuitry configured to:
periodically generate array snapshots of the first volume;
send the differences between the array snapshots to the replica site;
write snapshot data to a replica DO stream if the replica is in a journal mode;
periodically generate storage snapshots at the replica site when data of a full snapshot is applied if the replica is in a journal mode;
write a snapshot to the replica volume if the replica is not in a journal mode; and
generate a snapshot of the replica volume if the replica is not in a journal mode.

14. The apparatus of claim 8, further comprising circuitry configured to:
perform journal snapshots between array snapshots;
receive a request to restore the replica volume at a point in time;
restore an array snapshot before a journal snapshot; and
roll a journal to the point-in-time.

15. An article comprising:
a non-transitory computer-readable medium that stores computer-executable instructions, the instructions causing a machine to:
replicate a first volume in a data protection system by sending data from the first volume to a replica site;
determine whether the replica site should transition from a journal mode to a non-journal mode or transition from the non-journal to the journal mode based on the performance of the data protection system;
transition the replica site from the journal mode to the non-journal mode if the performance of the data protection system degrades based on a first performance threshold comprising at least one of a journal lag being larger than a lag threshold and a storage bandwidth being higher than a storage bandwidth threshold; and
transition the replica site from the non-journal mode to the journal mode if the performance of the data protection system improves based on a second performance threshold comprising at least one of the journal lag being smaller than the lag threshold and the storage bandwidth being smaller than the storage bandwidth threshold.

16. The article of claim 15, wherein the instructions causing the machine to replicate the first volume by sending the data to a replica site comprises at least one of instructions causing the machine to:
send snapshots of the first volume; or
send write I/Os for the first volume to the replica site.

17. The article of claim 15, wherein the instructions causing the machine to transition the replica site from the journal mode to the non-journal mode if the performance of the data protection system degrades comprises instructions causing the machine to:
generate snapshots of the first volume at the replica site;
generate a data structure of locations that have been overwritten in a DO stream;
write new I/Os from the first volume directly to a second volume; and
write data that has not been overwritten from the journal to the second volume.

18. The article of claim 15, wherein the instructions causing the machine to transition the replica site from the non-journal mode to the journal mode if the performance of the data protection system improves a second performance threshold comprises instructions causing the machine to:
write new data for the first volume to a journal; and
generate periodically a snapshot of the replica of first volume.

19. The article of claim 15, further comprising instructions causing the machine to:
- periodically generate array snapshots of the first volume;
- send the differences between the array snapshots to the replica site;
- write snapshot data to a replica DO stream if the replica is in a journal mode;
- periodically generate storage snapshots at the replica site when data of a full snapshot is applied if the replica is in a journal mode;
- write a snapshot to the replica volume if the replica is not in a journal mode; and
- generate a snapshot of the replica volume if the replica is not in a journal mode.

20. The article of claim 15, further comprising instructions causing the machine to:
- perform journal snapshots between array snapshots;
- receive a request to restore the replica volume at a point in time;
- restore an array snapshot before a journal snapshot; and
- roll a journal to the point-in-time.

\* \* \* \* \*